United States Patent
Magnusson et al.

(10) Patent No.: US 10,795,174 B1
(45) Date of Patent: Oct. 6, 2020

(54) FLAT-TOP NARROW BANDPASS FILTERS BASED ON CASCADED RESONANT GRATINGS

(71) Applicants: Robert Magnusson, Arlington, TX (US); Yeong Hwan Ko, Grand Prairie, TX (US)

(72) Inventors: Robert Magnusson, Arlington, TX (US); Yeong Hwan Ko, Grand Prairie, TX (US)

( * ) Notice: Subject to any disclaimer, the term of this patent is extended or adjusted under 35 U.S.C. 154(b) by 0 days.

(21) Appl. No.: 15/783,988

(22) Filed: Oct. 13, 2017

Related U.S. Application Data

(60) Provisional application No. 62/407,846, filed on Oct. 13, 2016.

(51) Int. Cl.
G02B 5/18 (2006.01)
G02B 27/42 (2006.01)
(Continued)

(52) U.S. Cl.
CPC ........... *G02B 27/4244* (2013.01); *G02B 5/18* (2013.01); *G02B 5/20* (2013.01); *G02B 27/44* (2013.01)

(58) Field of Classification Search
CPC .............. G02B 5/18; G02B 2005/1804; G02B 5/1809; G02B 5/1814; G02B 5/1829; G02B 5/1861; G02B 5/1866; G02B 5/1871; G02B 27/42; G02B 27/4233; G02B 27/4244; G02B 27/4266; G02B 27/4272; G02B 27/4277; G02B 27/4288; G02B 27/44
(Continued)

(56) References Cited

U.S. PATENT DOCUMENTS 9,036,967 B2 * 5/2015 Monmayrant ............ G01J 3/18
385/37
2017/0082786 A1 * 3/2017 Magnusson .......... G02B 5/1861

OTHER PUBLICATIONS

R. Magnusson and S. S. Wang, Transmission bandpass guided-mode resonance filters, Appl. Opt. 34, 8106 (1995).
(Continued)

*Primary Examiner* — Arnel C Lavarias
(74) *Attorney, Agent, or Firm* — Shiells Law Firm P.C.; Theodore F. Shiells

(57) ABSTRACT

Narrow bandpass filters are useful in numerous practical applications including laser systems, imaging, telecommunications, and astronomy. Traditionally implemented with thin-film stacks, there exists alternate means incorporating photonic resonance effects. Accordingly, here we disclose a new approach to bandpass filters that engages the guided-mode resonance effect working in conjunction with a cavity-based Fabry-Pérot resonance to flatten and steepen the pass band. Both of these resonance mechanisms are native to simple resonant bandpass filters placed in a cascade. To support the disclosure, numerical examples provide quantitative spectral characteristics including pass-band shape and sideband levels. Thus, we compare the spectra of single-layer 1D- and 2D-patterned resonant gratings with a dual-grating cascade design incorporating mathematically identical gratings. Dual and triple cascade designs are measured against a classic multi-cavity thin-film filter with 151 layers. The disclosed examples show comparable and improved results achieved with these sparse structures while engaging principles absent in corresponding state-of-the-art technology.

16 Claims, 6 Drawing Sheets

(51) Int. Cl.
*G02B 5/20* (2006.01)
*G02B 27/44* (2006.01)

(58) Field of Classification Search
USPC ....... 359/558, 566, 569, 572, 573, 574, 575, 359/576
See application file for complete search history.

(56) References Cited

OTHER PUBLICATIONS

S. Tibuleac, R. Magnusson, P. P. Young, and T. R. Holzheimer, Experimental verification of waveguide-mode resonant transmission filters, IEEE Microw. Guided Wave Lett. 9, 19 (1999).

Y. Kanamori, M. Shimono, and K. Hane, Fabrication of transmission color filters using silicon subwavelength gratings on quartz substrates. IEEE Photon. Technol. Lett. 18, 2126-2128 (2006).

J. M. Foley, S. M. Young, and J. D. Phillips, Narrowband midinfrared transmission filtering of a single layer dielectric grating. Appl. Phys. Lett. 103, 071107 (2013).

M. S. Amin, J. W. Yoon, and R. Magnusson, Optical transmission filters with coexisting guided-mode resonance and Rayleigh anomaly. Appl. Phys. Lett. 103, 131106 (2013).

M. Niraula, J. W. Yoon, and R. Magnusson, Single-layer optical bandpass filter technology. pt. Lett. 40, 5062-5065. (2015).

S. Tibuleac and R. Magnusson, Narrow-linewidth bandpass filters with diffractive thin-film layers. Opt. Lett. 26, 584 -586 (2001).

Y. Ding and R. Magnusson, Resonant leaky-mode spectral-band engineering and device applications, Opt. Express 12, 5661-5674 (2004).

M. Scobey, P. Egerton, and R. Fortenberry, Advanced plasma deposition improves ultranarrow band optical filters (SPIE Newsroom, 2013). DOI: 10.1117/2.1201312.005269.

H. A. Macleod, "Band-pass filters" in Thin-film optical filters, fourth edition (Taylor and Francis Group, LLC, 2012), pp. 299-401.

R. Magnusson, "Wideband reflectors with zero-contrast gratings," Opt. Lett. 39, 4337-4340 (2014).

D. Rosenblatt, A. Sharon, and A. A. Friesem, "Resonant grating waveguide structure," IEEE J. Quantum Electron., vol. 33, No. 11, pp. 2038-2059, Nov. 1997.

Y. Ding and R. Magnusson, "Band gaps and leaky-wave effects in resonant photonic-crystal waveguides," Opt. Express, vol. 15, No. 2, pp. 680-694, Jan. 22, 2007.

R. F. Kazarinov and C. H. Henry, "Second-order distributed feedback lasers with mode selection provided by first-order radiation loss," IEEE J. Quantum Electron., vol. 21, pp. 144-150, Feb. 1985.

Y. Ding and R. Magnusson, "Resonant leaky-mode spectral-band engineering and device applications," Opt. Exp. 12, 5661-5674 (2004).

T. K. Gaylord and M. G. Moharam, "Analysis and applications of optical diffraction by gratings," in Proc. IEEE, vol. 73, No. 5, pp. 894-937, 1985.

M. G. Moharam, D. A. Pommet, E. B. Grann, and T. K. Gaylord, "Stable implementation of the rigorous coupled-wave analysis for surface-relief gratings: enhanced transmittance matrix approach," J. Opt. Soc. Am. A, vol. 12, No. 5, pp. 1077-1086, May 1995.

H. Y. Song, S. Kim, and R. Magnusson, Opt. Express 17, 23544 (2009).

M. S. Amin, "Design, fabrication and characterization of guided-mode resonance transmission filters," Ph.D. Univ. Texas, Arlington (2014).

20. Y. Horie, A. Arababi, S. Han, and A. Faraon, Opt, Express 23, 29848 (2015).

* cited by examiner

FLAT-TOP NARROW BANDPASS FILTERS BASED ON CASCADED RESONANT GRATINGS

CROSS REFERENCE TO RELATED APPLICATION

This application claims priority pursuant to 35 U.S.C. § 119(e) to U.S. Provisional Patent Application Ser. No. 62/407,846, filed on Oct. 13, 2016, which is hereby incorporated by reference in its entirety.

FIELD

We disclose a new class of flat-top narrow bandpass filters that require much fewer layers than state-of-the-art thin-film filters. Said bandpass filters exhibit nearly square filtering profiles as needed in a host of pertinent applications. This new flat-top filter concept, based on the guided-mode resonance (GMR) effect in spatially periodic films, is an alternative to traditional Fabry-Pérot resonance (FPR) filters stacked with tens to hundreds of thin-film layers. The disclosed filters apply cascaded resonant periodic layers to yield flat-top filter spectra with extremely low sidebands that compare favorably with well-known classical thin-film filter designs.

BACKGROUND OF THE INVENTION

Multilayer dielectric thin films are widely applied to implement metal-free and thus low-loss filters, polarizers, and reflectors for incorporation in various common optical systems. These devices typically consist of stacks of homogeneous layers deposited with precise thicknesses and tight control of index of refraction and absorption. In many cases, a large number of layers, perhaps ~10-100, may be needed to create the spectral attributes required for a particular application. These optical devices operate on the basis of multiple reflections between the interfaces incorporated in a layered stack. Typically, quarter-wave layer systems provide the low transmission sidebands whereas an inclusion of a defect layer, such as a half-wave layer, provides the transmission peak. As is known in the art, numerous thin-film filter designs are achieved with creative intermingling of quarter-wave thick, half-wave thick, and arbitrary thickness films [H. A. Macleod, "Band-pass filters" in Thin-film optical filters, fourth edition (Taylor and Francis Group, L L C, 2012)].

The field of thin-film optics is a mature technological area. There are numerous companies and/or industries producing optical filters and devices of a great variety throughout the world. These devices are typically deposited using sputtering, thermal evaporation, or electron-beam evaporation in vacuum chambers. Examples of currently marketed devices utilizing multilayered arrangements include laser mirrors, polarizers, antireflection film systems, bandpass filters, bandstop filters, edge filters, lowpass filters, highpass filters, phase plates, tunable optical devices and/or filters, sensors, modulators, polarization control devices, hyper-spectral arrays, sensor arrays, high-power lasers, high-Q optical cavities, high-finesse interferometers, and beam splitters. Practical issues in thin-film manufacturing include adhesion difficulties associated with forming the multilayered stacks as well as losses inherently associated with multilayered arrangements. Delamination failures under thermal expansion and high-power laser irradiation can occur. Nevertheless, this technology has systematically advanced over a very long time, overcoming many of these issues.

In contrast to classic thin-film filters, we provide resonant filters that have by comparison minimal material embodiments. In particular, bandpass filters based on the guided-mode resonance (GMR) effect in periodic layers were first conceptualized in 1995 [R. Magnusson and S. S. Wang, Transmission bandpass guided-mode resonance filters, Appl. Opt. 34, 8106 (1995)]. Since then, there has been only modest activity in experimental validation of this concept. The first direct measurement of a GMR transmission peak surrounded by low sidebands was carried out in the 4-20 GHz microwave region [S. Tibuleac, R. Magnusson, P. P. Young, and T. R. Holzheimer, Experimental verification of waveguide-mode resonant transmission filters, IEEE Microw. Guided Wave Lett. 9, 19, 1999.]. Later, Kanamori et al. fabricated color filters with efficiencies in the range of ~55-70% but with wide bandwidths ~100 nm and without effective sideband suppression [Y. Kanamori, M. Shimono, and K. Hane, Fabrication of transmission color filters using silicon subwavelength gratings on quartz substrates. IEEE Photon. Technol. Lett. 18, 2126-2128, 2006.]. Foley et al. reported transmission resonance with passband efficiency ~35% and a broad bandwidth exceeding 500 nm in the mid-infrared band; these devices operated only under off-normal incidence [J. M. Foley, S. M. Young, and J. D. Phillips, Narrowband mid-infrared transmission filtering of a single layer dielectric grating. Appl. Phys. Lett. 103, 071107, 2013.]. Amin et al. provided a Rayleigh-anomaly-assisted transmission filter with ~50% efficiency in the near-infrared domain [M. S. Amin, J. W. Yoon, and R. Magnusson, Optical transmission filters with coexisting guided-mode resonance and Rayleigh anomaly. Appl. Phys. Lett. 103, 131106, 2013.]. These experimental devices all lack the flat, low stopbands and narrow passbands that are essential in most applications. Most recently, using crystalline silicon (c-Si) on a quartz substrate, we reported a single-layer experimental filter exhibiting a transmittance of ~72%, bandwidth of ~0.5 nm, and low sidebands spanning ~100 nm at normal incidence [M. Niraula, J. W. Yoon, and R. Magnusson, Single-layer optical bandpass filter technology. Opt. Lett. 40, 5062-5065, 2015.]. This successful experimental observation proves the viability of this approach. However, it lacks the deep, low sidebands and flat spectral tops that are needed in applications. The current invention remedies this deficiency.

The physical basis for GMR transmission filters has been explained before [M. Niraula, J. W. Yoon, and R. Magnusson, Single-layer optical bandpass filter technology. Opt. Lett. 40, 5062-5065, 2015; S. Tibuleac and R. Magnusson, Narrow-linewidth bandpass filters with diffractive thin-film layers. Opt. Lett. 26, 584-586, 2001; Y. Ding and R. Magnusson, Resonant leaky-mode spectral-band engineering and device applications, Opt. Express 12, 5661-5674, 2004.]. In summary, upon illumination there ensues a dual-resonance process where the lateral resonant Bloch modes supporting leaky-mode resonance are excited by distinct evanescent diffraction orders. For example, the filter in [M. Niraula, J. W. Yoon, and R. Magnusson, Single-layer optical bandpass filter technology. Opt. Lett. 40, 5062-5065, 2015.] yields a sharp transmission peak by second-order coupling to the fundamental $TE_0$ Bloch mode. The wide flat sidebands are generated by first-order coupling to the $TE_2$ mode. The component bandpass filters presented herein operate similarly.

GMR filters render a desired spectral response by careful design via their structural parameters including period, fill factor, grating depth, and spatial modulation strength by choice of materials. Achieving a flat-top bandpass spectrum is nontrivial because the characteristic external spectral signatures are Lorenzian in form. For many applications, high-quality filters require rectangular spectra with flat tops, steep-slope drop-off and low sidebands all while retaining high efficiency [M. Scobey, P. Egerton, and R. Fortenberry, Advanced plasma deposition improves ultra-narrow band optical filters (SPIE Newsroom, 2013). DOI: 10.1117/2.1201312.005269; H. A. Macleod, "Band-pass filters" in Thin-film optical filters, fourth edition (Taylor and Francis Group, L L C, 2012)]. Currently, flat-top narrow bandpass filters are made with multiple Fabry-Pérot cavities based on the principles of thin-film optics. Such filters may embody more than 100 stacked layers on a substrate [H. A. Macleod, "Band-pass filters" in Thin-film optical filters, fourth edition (Taylor and Francis Group, L L C, 2012)].

Furthermore, FIG. 1(a) shows a schematic model representative of 1D resonant periodic device under normal incidence of input light. A two-layer element with thicknesses $d_g$ and $d_h$, fill factor F, and a two-part period Λ is illustrated with the refractive indices of the various regions (cover (c), device (d), substrate (s)) denoted as n. When phase matching occurs between evanescent diffraction orders and a waveguide mode, a reflection resonance takes place. Here, I, R, and T denote the incident wave with wavelength λ, reflectance, and transmittance, respectively. As known in the art, reflectance is defined as the ratio of the reflected intensity to the incident intensity where intensity is measured in W/m². Transmittance is defined in an analogous fashion. FIG. 1(b) shows a schematic dispersion diagram of a subwavelength grating at the second stop band. For the symmetric grating profile, a resonance appears at one edge. This picture applies to both TE (electric field vector normal to the plane of incidence and parallel to the y-direction) and TM (magnetic field vector normal to the plane of incidence and parallel to the y-direction) polarization states. Here, the grating vector has magnitude K=2π/Λ, the wavenumber of the input wave is $k_0$=2π/λ, and β is the propagation constant of a leaky mode. In the example in FIG. 1(a), the corresponding grating vector is given by K=Kx where x is a unit vector along the x-direction. The direction of periodicity is often defined by the grating vector; this concept can be generalized to two dimensions in which the grating vector would also have a y-component.

The device shown in FIG. 1 denotes a "zero-contrast grating" (ZCG) as the grating ridges are matched to a sublayer made out of the same material; hence, no phase changes occur for a ridge mode transiting across the ridge/sublayer interface [R. Magnusson, "Wideband reflectors with zero-contrast gratings," Opt. Lett. 39, 4337-4340, 2014.]. We show a two-layer element in air as a canonical architecture for a component resonant grating. Under normal incidence, counter-propagating leaky modes form a standing wave in the device as indicated in FIG. 1(a). As the modes interact with the waveguide grating, they re-radiate reflectively [D. Rosenblatt, A. Sharon, and A. A. Friesem, "Resonant grating waveguide structure," IEEE J. Quantum Electron., vol. 33, no. 11, pp. 2038-2059, November 1997.]. A schematic dispersion diagram is shown in FIG. 1(b). The device works in the second stop band corresponding to the second-order grating [Y. Ding and R. Magnusson, "Band gaps and leaky-wave effects in resonant photonic-crystal waveguides," Opt. Express, vol. 15, no. 2, pp. 680-694, Jan. 22, 2007.]. A given evanescent diffraction order can excite not just one but several leaky modes. To emphasize this point, in FIG. 1(b) we show the stop bands for the first two transverse electric (TE) modes. At each stop band, a resonance is generated as denoted in FIG. 1(b). The fields radiated by these leaky modes in a grating with a symmetric profile can be in phase or out of phase at the edges of the band [R. F. Kazarinov and C. H. Henry, "Second-order distributed feedback lasers with mode selection provided by first-order radiation loss," IEEE J. Quantum Electron., vol. 21, pp. 144-150, February 1985.]. At one edge, there is a zero phase difference, and hence the radiation is enhanced while at the other edge, there is a π phase difference inhibiting the radiation. In this case, if $β=β_R+jβ_I$ is the complex propagation constant of the leaky mode, then $β_I=0$ at one edge, which implies that no leakage is possible at that edge. Here, j denotes the imaginary unit. For asymmetric grating profiles, there is a resonance at each band edge [Y. Ding and R. Magnusson, "Band gaps and leaky-wave effects in resonant photonic-crystal waveguides," Opt. Express, vol. 15, no. 2, pp. 680-694, Jan. 22, 2007.]. Spectral characteristics and local fields of GMR [Y. Ding and R. Magnusson, "Resonant leaky-mode spectral-band engineering and device applications," Opt. Exp. 12, 5661-5674, 2004.] devices can be expeditiously quantified with exact numerical methods, for example, with rigorous coupled-wave analysis (RCWA) computer codes [T. K. Gaylord and M. G. Moharam, "Analysis and applications of optical diffraction by gratings," in Proc. IEEE, vol. 73, no. 5, pp. 894-937, 1985; M. G. Moharam, D. A. Pommet, E. B. Grann, and T. K. Gaylord, "Stable implementation of the rigorous coupled-wave analysis for surface-relief gratings: enhanced transmittance matrix approach," J. Opt. Soc. Am. A, vol. 12, no. 5, pp. 1077-1086, May 1995.].

DETAILED DESCRIPTION OF THE INVENTION

Figure 1:
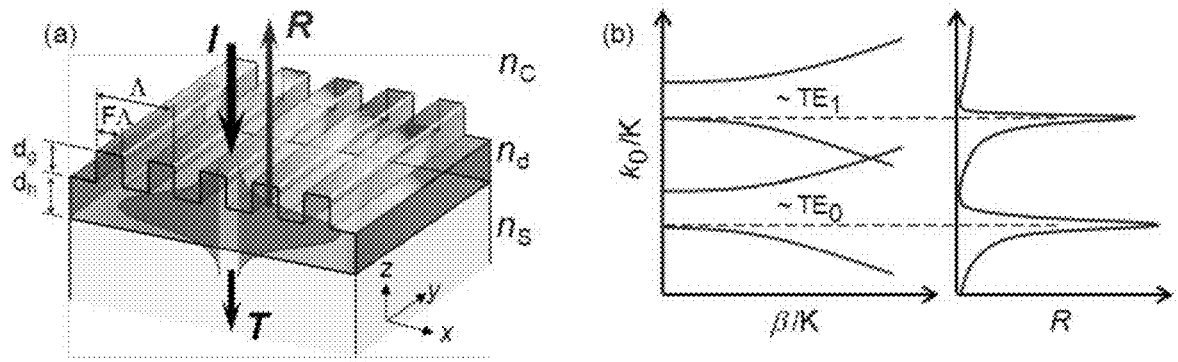
FIG. 1 illustrates (a) A schematic view of a subwavelength periodic element under normal incidence and (b) A schematic dispersion diagram of a subwavelength grating at the second stop band.
Figure 2:
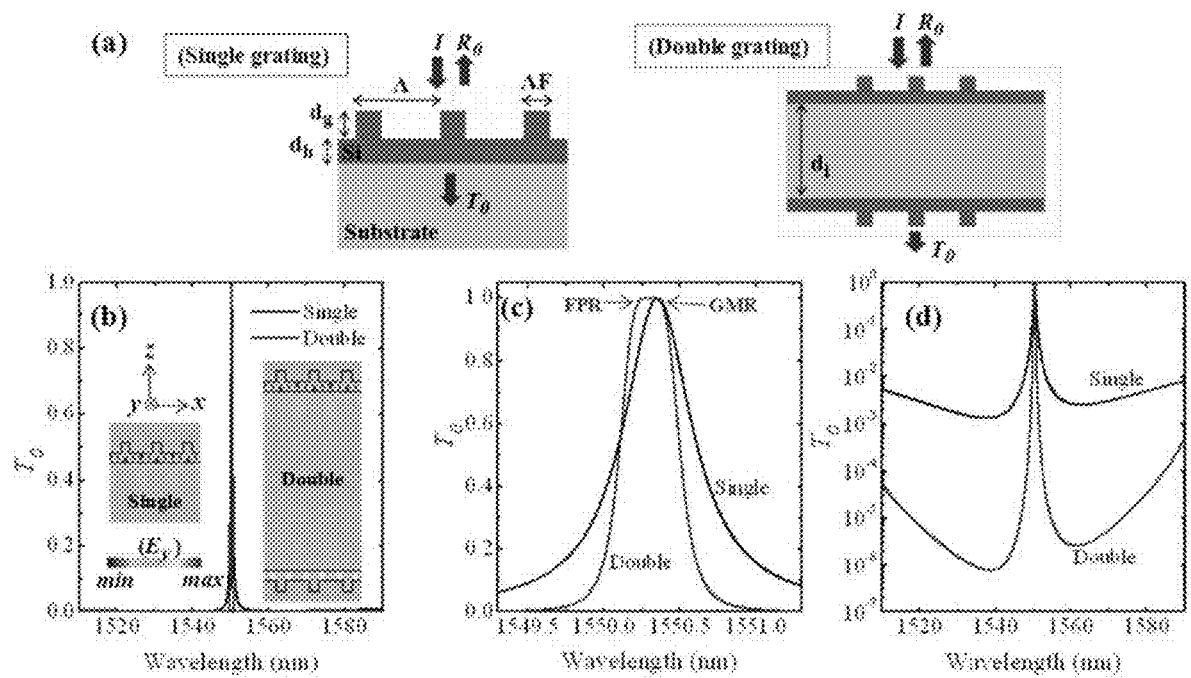
FIG. 2 illustrates a comparison between single and double ZCG resonant BPFs and example spectra according to one inventive embodiment described herein.

We provide a new concept for flat-top bandpass filters. It is implemented by cascaded guided-mode resonance (GMR) structures. Applying two identical GMR bandpass filters (BPFs) spaced by an interlayer substrate (i. e., a double GMR grating), an optical cavity forms on account of the highly reflective sidebands possessed by each filter. Therefore, this arrangement generates an additional Fabry-Pérot resonance (FPR) whose peak position can be tuned by controlling the interlayer thickness. Previously, dual wideband GMR reflectors were used to realize tunable narrowband FP transmission filters but without the GMR transmission mode [H. Y. Song, S. Kim, and R. Magnusson, Opt. Express 17, 23544, 2009; M. S. Amin, "Design, fabrication and characterization of guided-mode resonance transmission filters," Ph.D. dissertation, Univ. Texas, Arlington 2014; Y. Horie, A. Arababi, S. Han, and A. Faraon, Opt, Express 23, 29848, 2015.]. In contrast, here we combine the cavity-FPR and bandpass-GMR modes of operation to realize superior filter performance. Representative examples of dual and multiple cavity devices are shown. At first, we compare single and double GMR elements in FIG. 2. A narrow bandpass filter, as depicted in the schematic of FIG. 2(a), has a one-dimensional (1D) c-Si grating layer on a quartz substrate. In 1D periodic structures, such as the grating in FIG. 2(a), the period or periodicity varies along a single spatial direction namely the x-direction as in FIG. 1(a). This resonant structure defined by a partially etched single layer is sometimes called a zero-contrast grating (ZCG) [R. Magnusson, "Wideband reflectors with zero-contrast gratings," Opt. Lett. 39, 4337-4340, 2014.]. It can be optimized numerically for example with rigorous coupled-wave analysis (RCWA) [M. G. Moharam, D. A. Pommet, E. B. Grann, and T. K. Gaylord, "Stable implementation of the rigorous coupled-wave analysis for surface-relief gratings: enhanced transmittance matrix approach," J. Opt. Soc. Am. A, vol. 12, no. 5, pp. 1077-1086, May 1995.].

In the results illustrated in FIG. 2, the grating structure is defined by a period (Λ=1016 nm), fill factor or duty cycle (F=0.3), homogenous layer thickness ($d_h$=297 nm), and grating depth ($d_g$=332 nm). Herein, the input light is transverse-electric (TE) polarized with the electric vector oriented along the grating grooves. The double ZCG resonator is designed by adding an identical GMR grating to the backside of the interlayer. The GMR element spacing is set by numerical design. It is large enough to keep the two GMRs uncoupled. For both zero-order transmittance spectra ($T_0$) in FIG. 2(b), the sharp peak with 100% transmittance is commonly observed at 1550.3 nm. In the inset of FIG. 2(b), the calculated electric field distributions in the single and double GMR gratings confirm a second-order resonant coupling to the fundamental mode ($TE_0$) at the transmission peak.

In FIG. 2(c), it is seen that the double-GMR BPF provides a narrower bandwidth and steeper slope than the single BPF. Moreover, the double BPF exhibits a flattened peak owing to the additional FPR originating in the cavity. Meanwhile, the GMR position does not change appreciably. To specify the level of sidebands, FIG. 2(d) displays the log-scaled plots of the corresponding $T_0$ spectra. The single BPF exhibits a lowest sideband $T_0$=2×10$^{-3}$ at 1540 nm. For the double device, the sidebands rapidly decrease off resonance. At 1540 nm, the sideband is near $T_0$=6×10'.

To analyze the additional FPR and its functionality in the double GMR grating, we show the $T_0$ spectra as a function of $d_i$ in FIG. 3(a) and compare with a standard model of a Fabry-Pérot etalon with the Airy function ($T_e$) given by [T. K. Gaylord and M. G. Moharam, "Analysis and applications of optical diffraction by gratings," in Proc. IEEE, vol. 73, no. 5, pp. 894-937, 1985.].

$$T_e(\lambda) = \frac{T^2(\lambda)}{1 - 2R(\lambda)\cos(\delta(\lambda)) + R^2(\lambda)} \quad (1)$$

Figure 3:
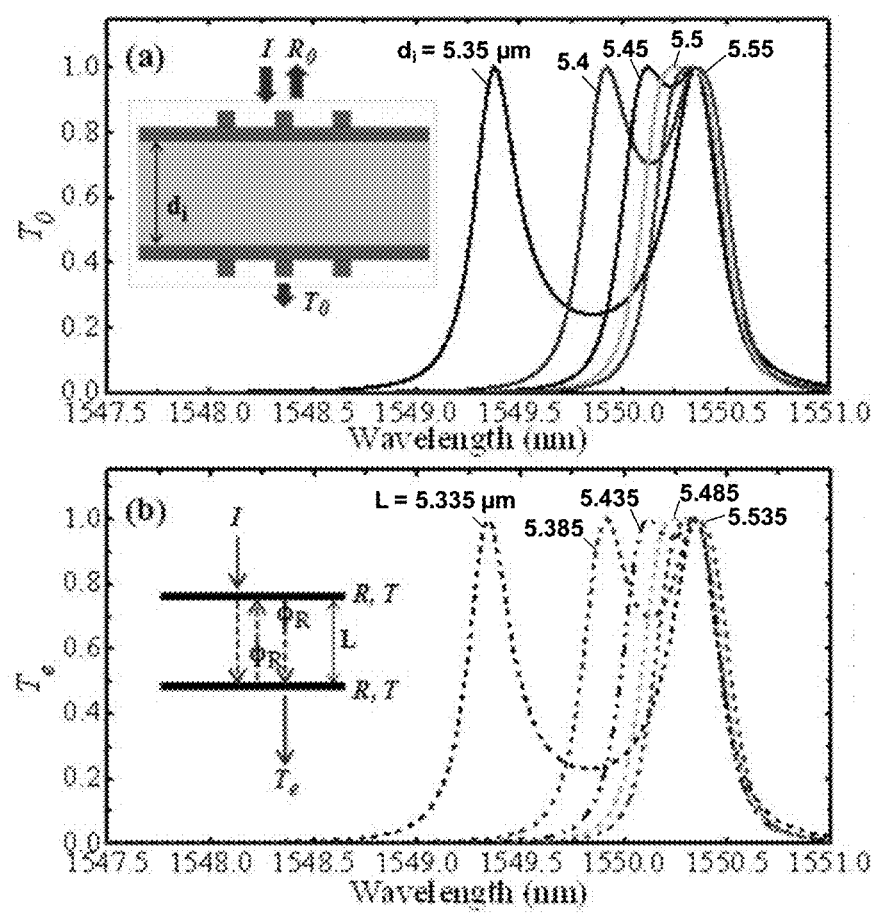
FIG. 3 illustrates Fabry-Perot resonance in a double guided-mode resonance grating. (a) RCWA transmittance for the double GMR device with varying $d_i$. (b) Numerical results using the Airy function in Eq. 1.
Figure 4:
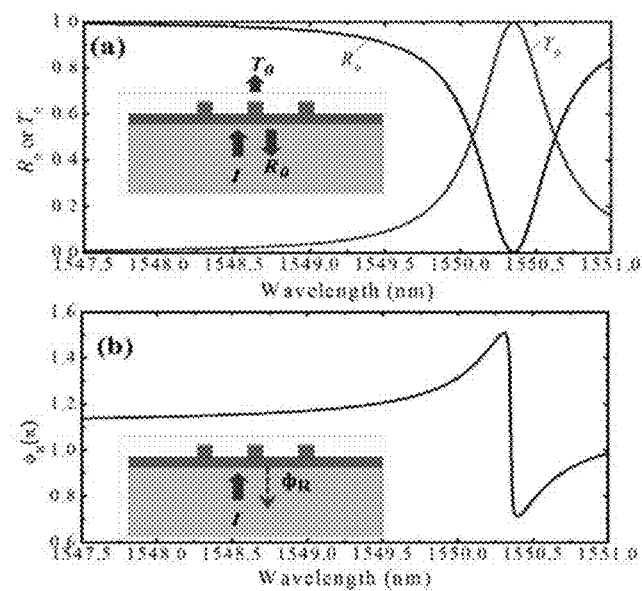
FIG. 4 illustrates (a) Diffraction efficiency ($R_0$ and $T_0$) spectra of a single GMR grating and (b) Reflective phase shift spectrum of a single GMR grating.

In Eq. (1), the T(λ) and R(λ) are transmittance and reflectance of a single GMR grating and the δ(λ) is the round-trip phase along the propagation direction of the etalon as depicted in the inset of FIG. 3(b) given by $$\delta(\lambda) = \frac{4\pi n L}{\lambda} - 2\phi_R(\lambda) \quad (2)$$

where n, L and $\phi_R$ refer to the refractive index of the interlayer, the cavity length, and the reflective phase of the single GMR grating. The calculated diffraction efficiencies ($T_0$, $R_0$) and reflective phase $\phi_R$, used in to obtain the calculated results in FIG. 3(b), are shown in FIG. 4(a) and FIG. 4(b). It is clear from FIG. 3 that the Fabry-Pérot etalon model agrees well with the induced FPR in the double GMR grating with L~$d_i$. As the $d_i$ or L increase, the FPR peak moves to a longer wavelength and the bandwidth gradually broadens. On the other hand, the GMR transmission peak position (λ=1550.3 nm) does not vary with $d_i$ or L because it only depends on the grating parameters. When the separation between the two component gratings is sufficiently large, the resonant Bloch modes are not coupled. Near the GMR peak position, the FPR combines with the GMR peak, yielding a flattened narrow bandpass spectrum.

Figure 5:
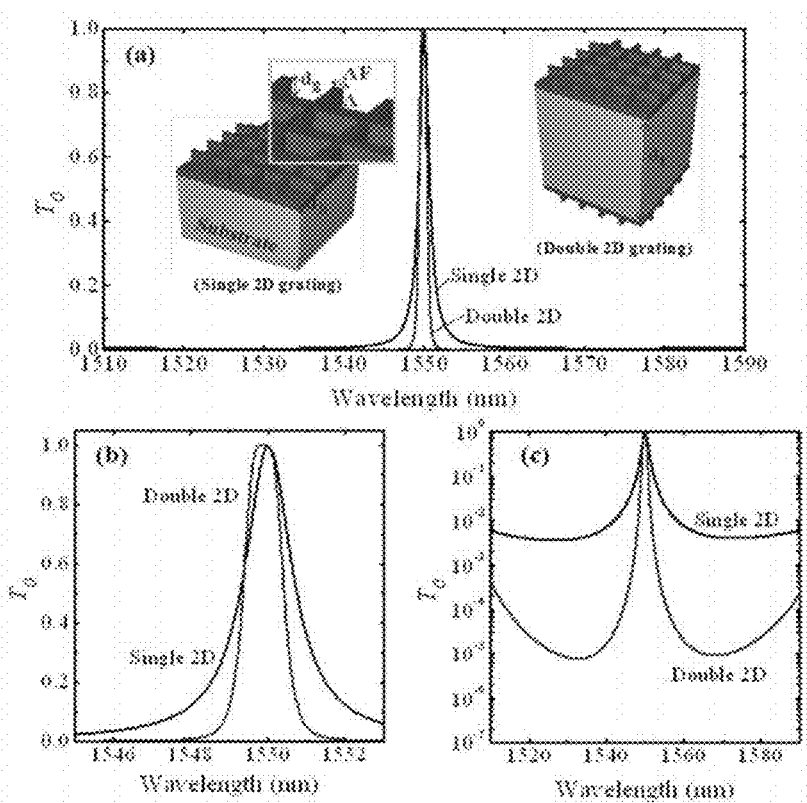
FIG. 5 illustrates 2D grating-based BPF embodiments. (a) $T_0$ spectra of single and double 2D BPFs at normal incidence. (b) Zoomed-in $T_0$ spectra and (c) log-scaled $T_0$ spectra.

As polarization independence at normal incidence is needed in many applications, we proceed to the design of flat-top bandpass filters utilizing same method with two-dimensional (2D) hole arrays as in FIG. 5. In 2D periodic structures, such as the gratings illustrated in FIG. 5(a), the period or periodicity varies along two spatial directions as seen in the inset of FIG. 5(a). The spectral response is polarization independent if the 2D grating has orthogonal symmetric periodicity (Λ=$Λ_x$=$Λ_y$) where $Λ_x$ is the period along one coordinate axis (x-axis) and $Λ_y$ is the period along the other coordinate axis (y-axis) using, for example, the coordinate system in FIG. 1(a). A narrow bandpass spectrum results by using the parametric design set {Λ=1020 nm, F=0.2, $d_h$=290 nm, $d_g$=390 nm, and $d_i$=5.5 μm}. FIG. 5(a) displays the $T_0$ spectra of the double 2D BPF structure exhibiting a resonance peak at 1550 nm. Again, the double structure provides a steeper and narrower spectral function as found for the 1D case in FIG. 1. Similarly, the double 2D grating shows a flat-top profile created by a combination of the FPR and GMR in FIG. 5(b) where the bandwidth is 1.1 nm. In the log-scaled plot of FIG. 5(c), the dual BPF exhibits significantly reduced sidebands down to $T_0$=6×10$^{-6}$ at 1530 nm.

Figure 6:
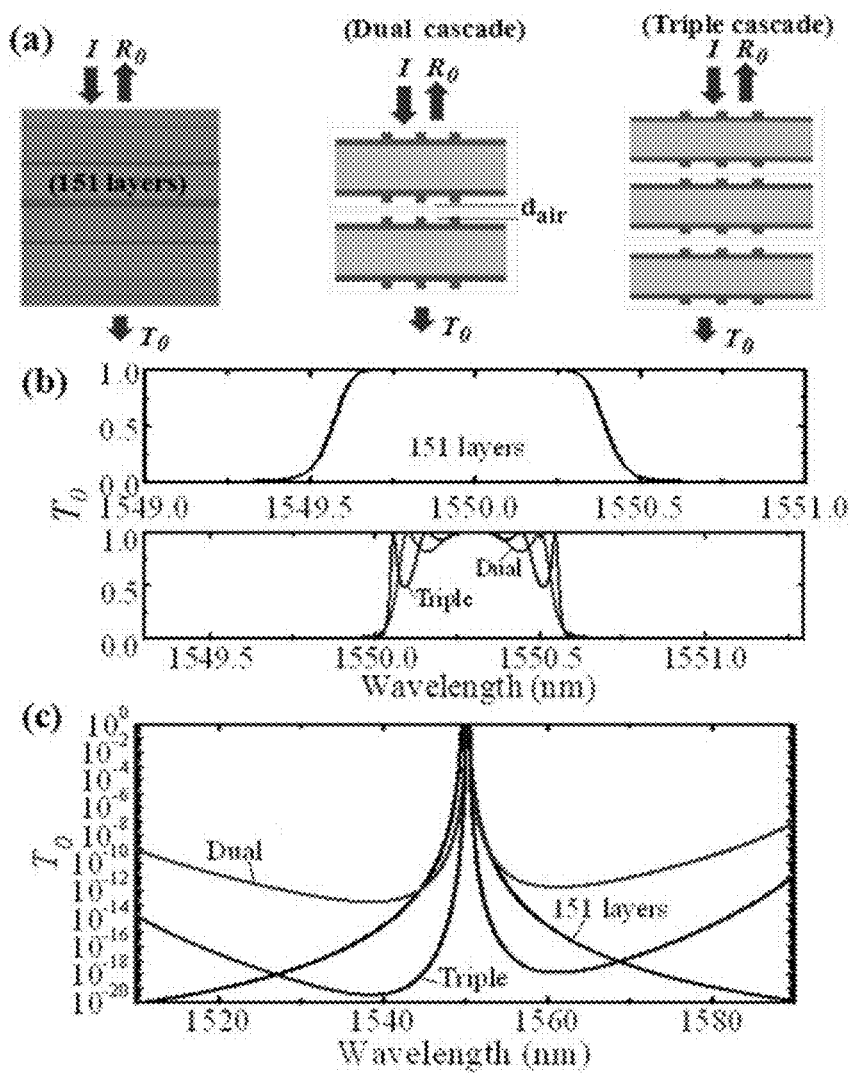
FIG. 6 illustrates cascaded double GMR BPFs ideas. (a) Schematic description of the dual and triple cascaded devices as compared to a thin-film bandpass filter with 151 layers. (b) Compared $T_0$ spectra for the traditional filter and cascaded devices. (c) Log-scaled plots of $T_0$ spectra.

Further describing cascaded band-pass filters, we use the flat-top BPFs with cascaded double-GMR gratings and compare with a traditional bandpass filter. FIG. 6(a) schematically depicts a thin-film filter with 151 layers along with dual and triple cascaded GMR-based filters. The multilayer device was optimally designed by stacked Fabry-Pérot resonant cavities at 1550 nm ($\lambda_0$) as discussed in [H. A. Macleod, "Band-pass filters" in Thin-film optical filters, fourth edition (Taylor and Francis Group, L L C, 2012)]. Therein, the multilayer filter was represented as: air |[1.2462 L 0.3458H] (HL)$^7$ H (HL)$^{15}$ H (4H(HL)$^{15}$5H)$^2$ (HL)$^{15}$ H (HL)$^7$ H| glass, where the H and L are quarter wavelength thicknesses $\lambda_0/4n_H$ and $\lambda_0/4\ n_L$ of $Ta_2O_5$ ($n_H$=2.15) and $SiO_2$ ($n_L$=1.45) films. For the cascade design, identical double GMR gratings are vertically arranged with an air gap distance $d_{air}$=1.82 μm.

Comparing the calculated $T_0$ spectra in FIG. 6(b), the cascaded design provides steeper and narrower filtering profiles than the traditional filter. However, there appear ripples degrading the flatness of the bandpass. Well known in thin-film theory, such prominent peaks at both sides of the band are called "rabbit's ears" and they are caused by a significant increase of equivalent admittance at the edge of pass band due to symmetrical periods [H. A. Macleod, "Band-pass filters" in Thin-film optical filters, fourth edition (Taylor and Francis Group, L L C, 2012)]. The levels of sidebands of corresponding structures are specified on a log-scale in FIG. 6(c). In principle, based on this analysis, the triple cascade filter performs best.

Figure 7:
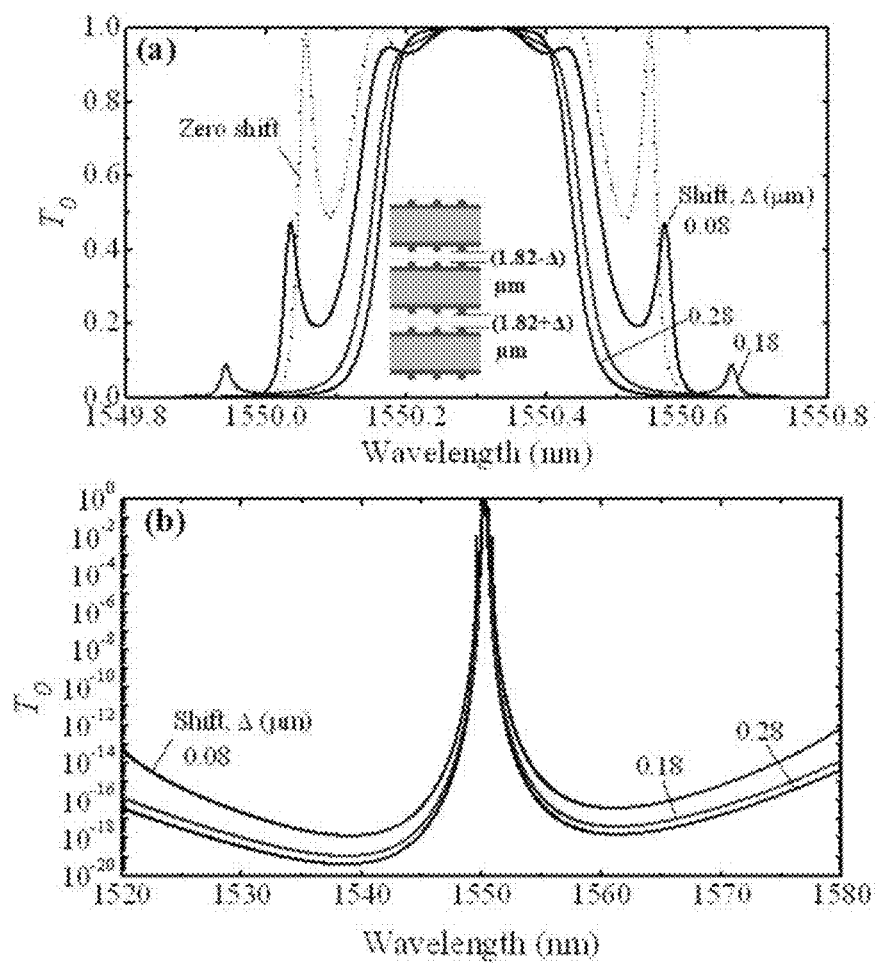
FIG. 7 illustrates an elimination of BPF rabbit's ears by spatial shifting of the middle module. (a) Computed $T_0$ spectra defining the effect of the shift in a triple cascade device. (b) Log-scaled plots of $T_0$ spectra.

As schematically illustrated in the inset of FIG. 7(a), we shift the middle module in the triple cascade structure in order to reduce the ripples in the pass band. By shifting from zero to 0.28 μm, the peaks at either side gradually diminish and the peak positions move away from the pass band. There results a flat-top band pass profile. The log-scaled $T_0$ spectra in FIG. 7(b) indicate the sideband levels in each case.

Figure 8:
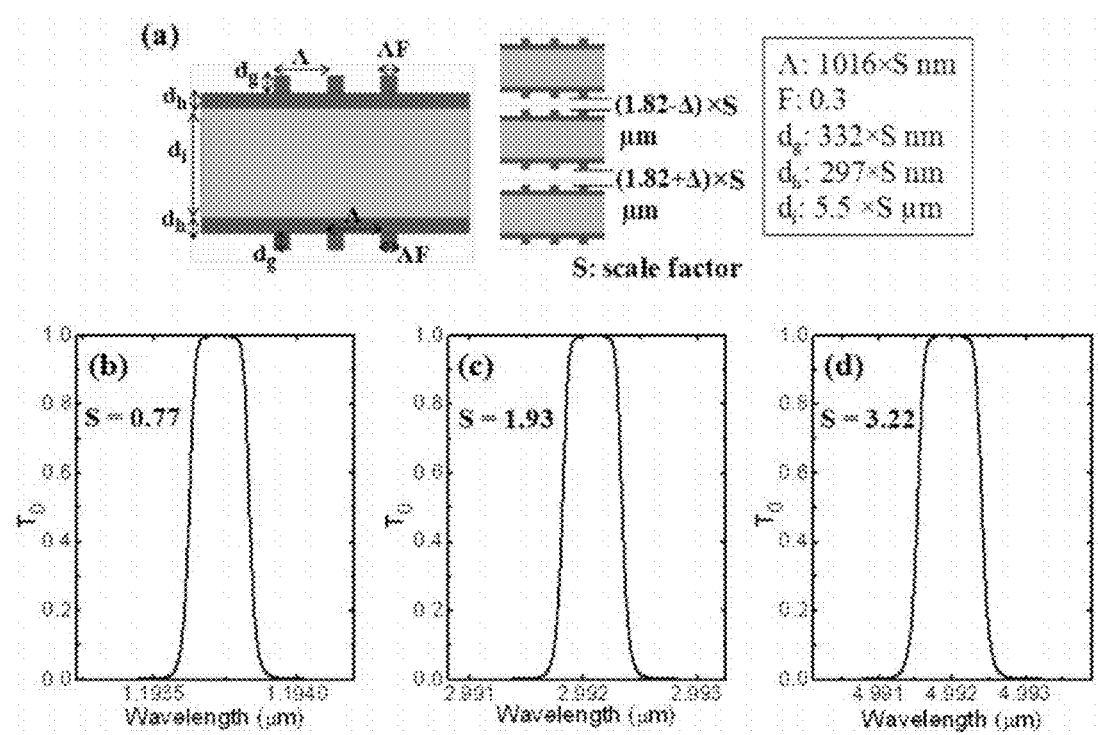
FIG. 8 illustrates controllable center wavelength of bandpass filters utilizing scale factor. (a) Triple cascaded grating architecture designed by scale factor (S). The bandpass $T_0$ profiles for (b) S=0.77, (c) S=1.93, and (d) S=3.22.

The disclosed flat-top resonant bandpass filters with few layers are realizable in all spectral ranges where suitable low-loss, high-refractive-index media are available. By scaling the dimensions of the cascaded devices, we control the center wavelength of the pertinent bandpass filter. As shown in FIG. 8(a), we define the scale factor (S) that multiplies the design parameters except for the fill factor. The results of FIG. 8(b)-FIG. 8(d) show the flat-top bandpass filters operating near wavelengths of 1.19 μm (Δλ=200 pm), 2.99 μm (Δλ=500 pm), and 4.99 μm (Δλ, =890 pm) for S=0.77, 1.93, and 3.22. Therefore, this design covers wide spectral region from visible light to millimeter waves. Considering low loss materials and their refractive index for operating at specific wavelengths, the cascaded gratings can be designed to implement flat-top narrow bandpass filters in the various spectral regions of the electromagnetic spectrum.

Bandpass filter embodiments described herein can be understood more readily by reference to the detailed description and figures. Elements, apparatus, materials and methods described herein, however, are not limited to the specific embodiments presented in the detailed description, examples, and figures. It must be recognized that these embodiments are merely illustrative of the principles of the present invention. Various modifications and adaptations will be readily apparent to those of skill in the art without departing from the spirit and scope of the invention.

Methods

The elemental ZCG gratings incorporated in the cascaded bandpass filters disclosed herein are conveniently designed using ordinary computational resources. The same methods pertain to the final multi-grating BPFs. In particular, the analysis and design of periodic structures are expeditiously conducted using rigorous coupled-wave analysis (RCWA). This is an exact electromagnetic method to model the interaction of incident-light plane waves with multilayered periodic devices. These filter structures are fashioned with materials generally described with complex refractive indices; the RCWA method can fully account for such media. Moreover, such computer codes efficiently handle general combinations of 1D and 2D periodic- and homogeneous-layered structures. These codes run extremely fast and are found to be highly reliable as verified by repeated comparisons with experimental results. Additionally, coupled-wave electromagnetic field distributions, including resonant leaky-mode amplitudes, can be conveniently and efficiently computed with RCWA. The RCWA code can be used as the forward kernel in particle swarm optimization (PSO) codes. Yet another useful design tool pertinent for design of the BPFs is the finite-difference time-domain (FDTD) analysis method. This method can be used to model finite structures and time-varying fields.

BPF fabrication is done with standard methods including thin-film deposition, electron-beam patterning, reactive-ion etching, metallization, SEM/AFM inspection, ellipsometric characterization, etc. Particularly, for example, with a 266-nm laser interferometer capable of recording laterally-extensive periodic patterns in a single shot with periods Λ>200 nm and fill factors F ranging from 0.2 to 0.8 by exposure control, patterning of both 1D and 2D periodic layers can be efficiently accomplished. An interferometer with stepper capability under computer control would enable arrays of devices on wafers up to 6 inches in diameter to be expeditiously fabricated. Periodic devices are generally also made with imprint methods and molding as well as with electron-beam writing. Master molds can be made with electron beam patterning. For long wavelength devices where the periods exceed several micrometers, ordinary mask-based photolithography can be applied. For devices in the millimeter and microwave regions, methods based on machining or scribing apply as well.

The cascaded units, each consisting of two GMR gratings and a spacer (double grating in FIG. 2), can be arranged in series using precise spacers and adhesives; for example, UV-curable adhesives. Alternatively, slotted scaffolds, into which to insert the units, can be fashioned with microfabrication methods. In practice, for ease of handling, the resonant ZCGs may reside on substrates of appreciable thickness of perhaps 0.3 to 1 mm. The resultant added distance between units can be accounted for in the design calculations.

For spectral characterization in the frequency range of interest, matching sources and spectrum analyzers are needed. Ordinary means of polarization control may be needed. Devices whose spectra fall within the 1200- to 2400-nm band can be characterized for example with a Yokogawa AQ6375 spectrum analyzer in conjunction with a Koheras Super Continuum illuminating source. Longer-wavelength spectra can be measured with a Fourier-Transform Infrared Spectrometer (Shimadzu IR Prestige FTIR for example) that covers the ~1.3- to 28-μm spectral band with ample resolution. Reference samples with known characteristics can be used to ascertain the actual absolute values of reflectance and transmittance.

REFERENCES

1. R. Magnusson and S. S. Wang, Transmission bandpass guided-mode resonance filters, Appl. Opt. 34, 8106 (1995).

2. S. Tibuleac, R. Magnusson, P. P. Young, and T. R. Holzheimer, Experimental verification of waveguide-mode resonant transmission filters, IEEE Microw. Guided Wave Lett. 9, 19 (1999).
3. Y. Kanamori, M. Shimono, and K. Hane, Fabrication of transmission color filters using silicon subwavelength gratings on quartz substrates. IEEE Photon. Technol. Lett. 18, 2126-2128 (2006).
4. J. M. Foley, S. M. Young, and J. D. Phillips, Narrowband mid-infrared transmission filtering of a single layer dielectric grating. Appl. Phys. Lett. 103, 071107 (2013).
5. M. S. Amin, J. W. Yoon, and R. Magnusson, Optical transmission filters with coexisting guided-mode resonance and Rayleigh anomaly. Appl. Phys. Lett. 103, 131106 (2013).
6. M. Niraula, J. W. Yoon, and R. Magnusson, Single-layer optical bandpass filter technology. Opt. Lett. 40, 5062-5065 (2015).
7. S. Tibuleac and R. Magnusson, Narrow-linewidth bandpass filters with diffractive thin-film layers. Opt. Lett. 26, 584-586 (2001).
8. Y. Ding and R. Magnusson, Resonant leaky-mode spectral-band engineering and device applications, Opt. Express 12, 5661-5674 (2004).
9. M. Scobey, P. Egerton, and R. Fortenberry, Advanced plasma deposition improves ultra-narrow band optical filters (SPIE Newsroom, 2013). DOI: 10.1117/2.1201312.005269
10. H. A. Macleod, "Band-pass filters" in Thin-film optical filters, fourth edition (Taylor and Francis Group, L L C, 2012), pp. 299-401.
11. R. Magnusson, "Wideband reflectors with zero-contrast gratings," Opt. Lett. 39, 4337-4340 (2014).
12. D. Rosenblatt, A. Sharon, and A. A. Friesem, "Resonant grating waveguide structure," IEEE J. Quantum Electron., vol. 33, no. 11, pp. 2038-2059, November 1997.
13. Y. Ding and R. Magnusson, "Band gaps and leaky-wave effects in resonant photonic-crystal waveguides," Opt. Express, vol. 15, no. 2, pp. 680-694, Jan. 22, 2007.
14. R. F. Kazarinov and C. H. Henry, "Second-order distributed feedback lasers with mode selection provided by first-order radiation loss," IEEE J. Quantum Electron., vol. 21, pp. 144-150, February 1985.
15. Y. Ding and R. Magnusson, "Resonant leaky-mode spectral-band engineering and device applications," Opt. Exp. 12, 5661-5674 (2004).
16. T. K. Gaylord and M. G. Moharam, "Analysis and applications of optical diffraction by gratings," in Proc. IEEE, vol. 73, no. 5, pp. 894-937, 1985.
17. M. G. Moharam, D. A. Pommet, E. B. Grann, and T. K. Gaylord, "Stable implementation of the rigorous coupled-wave analysis for surface-relief gratings: enhanced transmittance matrix approach," J. Opt. Soc. Am. A, vol. 12, no. 5, pp. 1077-1086, May 1995.
18. H. Y. Song, S. Kim, and R. Magnusson, Opt. Express 17, 23544 (2009).
19. M. S. Amin, "Design, fabrication and characterization of guided-mode resonance transmission filters," Ph.D. dissertation, Univ. Texas, Arlington (2014).
20. Y. Horie, A. Arababi, S. Han, and A. Faraon, Opt, Express 23, 29848 (2015).

The invention claimed is:
1. A double-grating bandpass filter comprising:
a first zero-contrast resonant grating having a periodic pattern and a first homogeneous sublayer,
an interlayer having a first side, a second side, a thickness and an index of refraction, said first zero-contrast resonant grating being disposed on a first side of said interlayer,
a second zero-contrast resonant grating and second homogeneous sublayer identical or nearly identical to the first zero-contrast resonant grating and first homogeneous sublayer on said second side of said interlayer,
wherein the first zero-contrast grating, the interlayer, and the second grating combined form a band pass filter cascade unit fashioned to receive incident light to be filtered,
such that when a narrow spectrum of light is transmitted through the cascade unit, adjacent wavelengths are blocked by the cascade unit so as to output a bandpass spectrum.
2. The cascade unit in claim 1 forming a serial arrangement of two said units to constitute a dual cascade band pass filter.
3. The cascade unit in claim 1 forming a serial arrangement of three said units to constitute a triple cascade band pass filter.
4. The cascade unit in claim 1 forming a serial arrangement of multiple said units to constitute a multi cascade band pass filter.
5. The cascade unit in claim 1, wherein periodic pattern is one-dimensional.
6. The cascade unit in claim 1, wherein periodic pattern is two-dimensional.
7. The cascade unit in claim 1, wherein said first and second zero-contrast gratings are spaced a distance from one another is set to generate a Fabry-Pérot resonance near to a guided-mode resonance peak position.
8. The cascade unit in claim 1, wherein the interlayer is composed of a medium selected from a group consisting of air, glass, liquid, and polymer.
9. The cascade unit in claim 1, wherein the zero-contrast grating layer is composed of a medium selected from a non-limiting group consisting of $Si_3N_4$, $TiO_2$, $ZnO$, $Si$, $Ge$, epoxy, and fiberglass.
10. The cascade unit in claim 1, wherein the incident light is selected from a group consisting of visible light, infrared light, light at Terahertz frequency, or light at microwave frequency.
11. The triple cascade band pass filter in claim 3, where the triple cascade band pass filter has a middle cascade unit that is shiftable in position to reduce ripples in the bandpass spectrum.
12. The multi cascade band pass filter in claim 4, where selected cascade units are shiftable to reduce ripples in the bandpass spectrum.
13. The cascade unit in claim 1 wherein the homogeneous sublayer of the zero-contrast grating is extremely thin or zero.
14. The cascade unit in claim 1 designed to operate in various wavelength ranges by application of scaling factors.
15. The cascade unit in claim 1, wherein the first and second zero-contrast gratings and homogenous layer are silicon-on-insulator or silicon-on-quartz.
16. The cascade unit in claim 1, wherein the double-grating bandpass filter is positioned to receive incident polarized or unpolarized light at normal or non-normal incidence.

* * * * *